(12) United States Patent
An et al.

(10) Patent No.: US 9,451,014 B2
(45) Date of Patent: Sep. 20, 2016

(54) ACROSS-APPLICATION NETWORK COMMUNICATION METHOD AND DEVICE

(71) Applicant: TENCENT TECHNOLOGY (SHENZHEN) COMPANY LIMITED, Shenzhen, Guangdong (CN)

(72) Inventors: Tingting An, Shenzhen (CN); Quan Zou, Shenzhen (CN); Xiaowei Han, Shenzhen (CN); Xi Chen, Shenzhen (CN)

(73) Assignee: TENCENT TECHNOLOGY (SHENZHEN) COMPANY LIMITED, Shenzhen, Guangdong (CN)

( * ) Notice: Subject to any disclaimer, the term of this patent is extended or adjusted under 35 U.S.C. 154(b) by 385 days.

(21) Appl. No.: 14/039,775

(22) Filed: Sep. 27, 2013

(65) Prior Publication Data

US 2014/0025780 A1 Jan. 23, 2014

Related U.S. Application Data

(63) Continuation of application No. PCT/CN2012/072245, filed on Mar. 13, 2012.

(30) Foreign Application Priority Data

Mar. 28, 2011 (CN) .......................... 2011 1 0075144

(51) Int. Cl.
*G06F 15/16* (2006.01)
*H04L 29/08* (2006.01)
(Continued)

(52) U.S. Cl.
CPC ......... *H04L 67/10* (2013.01); *H04L 29/06768* (2013.01); *H04L 51/36* (2013.01); *H04L 63/08* (2013.01); *H04L 67/34* (2013.01)

(58) Field of Classification Search
CPC ... H04L 67/10; H04L 12/581; H04L 12/582; H04L 12/1813–12/1831; H04L 29/06755–29/06782; H04L 63/08–63/083
See application file for complete search history.

(56) References Cited

U.S. PATENT DOCUMENTS 6,567,813 B1 * 5/2003 Zhu ........................ G06Q 10/10
707/802
7,886,000 B1 * 2/2011 Polis .................... H04L 67/2833
455/466

(Continued)

FOREIGN PATENT DOCUMENTS

CN 101083692 A 12/2007
CN 101119335 A 2/2008
(Continued)

OTHER PUBLICATIONS

International Search Report for International Patent Application No. PCT/CN2012/072245, dated Jun. 28, 2012, and English translation thereof.
(Continued)

*Primary Examiner* — Brendan Higa
(74) *Attorney, Agent, or Firm* — Harness, Dickey & Pierce, P.L.C.

(57) ABSTRACT

An across-application network communication method and device including loading and starting a plug-in module of a local application, and sending, by the plug-in module of the local application, account information of a user to a server of an opposite application; verifying, by a server of the opposite application, the user according to the account information of the user, and when the verification is passed, allowing the plug-in module of the local application to obtain information of the user in the opposite application; and obtaining, by the plug-in module of the local application, the information of the user in the opposite application. The method and device can implement across-application network communication, so as to combine different Internet applications perfectly.

10 Claims, 4 Drawing Sheets a plug-in module of a local application is loaded and started, and the plug-in module of the local application sends account information of a user to a server of an opposite application — 101 the server of the opposite application verifies the user according to the account information, and after the verification is passed, allows the plug-in module of the local application to obtain information of the user in the opposite application — 102 the plug-in module of the local application obtains the information of the user in the opposite application — 103

(51) Int. Cl.
  *H04L 29/06* (2006.01)
  *H04L 12/58* (2006.01)

(56) References Cited

U.S. PATENT DOCUMENTS

| | | | |
|---|---|---|---|
| 2007/0266084 A1* | 11/2007 | Perkins | H04B 7/18506 709/203 |
| 2008/0188255 A1 | 8/2008 | Blicker | |
| 2010/0017616 A1* | 1/2010 | Nichols | G06F 21/41 713/183 |
| 2010/0100633 A1 | 4/2010 | Yan et al. | |

FOREIGN PATENT DOCUMENTS

| | | |
|---|---|---|
| CN | 101170745 A | 4/2008 |
| CN | 101291305 A | 10/2008 |

OTHER PUBLICATIONS

International Preliminary Report for International Application No. PCT/CN2012/072245 dated Oct. 1, 2013.

Chinese Office Action for Application No. 201110075144X dated Jun. 15, 2015, and an English concise explanation of relevance thereof.

* cited by examiner

ACROSS-APPLICATION NETWORK COMMUNICATION METHOD AND DEVICE

CROSS-REFERENCE TO RELATED APPLICATIONS

This application is a continuation of International Patent Application No. PCT/CN2012/072245 filed on Mar. 13, 2012. This application claims the benefit and priority of Chinese Application No. 201110075144.X, filed Mar. 28, 2011. The entire disclosures of each of the above applications are incorporated herein by reference.

FIELD

The present disclosure relates to communication technologies and to an across-application network communication method and device.

BACKGROUND

This section provides background information related to the present disclosure which is not necessarily prior art.

In many Internet applications, in order to enhance communication between users, most applications have implemented information pushing function of Instant Messaging (IM) and Social Networking Service (SNS) inside respective applications. For example, in a game platform, a game user may directly perform instant chat, obtain a buddy online prompt and query a buddy's game state inside or outside a game room. In this way, the communication between users in a single application may be effectively enhanced, the interests of users may be increased, and the communication experiences of Internet users in a single application may be improved.

However, in most user systems, multiple Internet applications may be run at the same time, e.g., IM, music playing, webpage browsing, game and so on. These applications may belong to account systems of the same type, e.g., a chat system and game system of the same application), or belong to different account systems, e.g., different email systems. A user only communicates with buddies in the applications of the same type, but cannot communicate with across-application buddies, which inevitably results in that the user must frequently switch among multiple applications to communicate with buddies. In such an application scenario, it is necessary to provide an across-application communication method for the user.

In present Internet application platforms, there is no across-application network communication method. The user only receives messages and online states of buddies in the current application. If the user intends to obtain information in other applications, the user must switch to other applications. However, such repeated switching results in different Internet applications being unable to be combined perfectly.

SUMMARY

This section provides a general summary of the disclosure, and is not a comprehensive disclosure of its full scope or all of its features.

Various embodiments provide an across-application network communication method, by which across-application instant communication can be implemented, so as to combine different Internet applications perfectly.

Various embodiments provide an across-application network communication device, by which across-application instant communication can be implemented, so as to combine different Internet applications perfectly.

An across-application network communication method includes:
loading and starting a plug-in module of a local application, and sending, by the plug-in module of the local application, account information of a user to a server of an opposite application;
verifying, by a server of the opposite application, the user according to the account information of the user, and when the verification is passed, allowing the plug-in module of the local application to obtain information of the user in the opposite application; and
obtaining, by the plug-in module of the local application, the information of the user in the opposite application.

An across-application network communication device includes:
a program module of a local application, configured to load and start a plug-in module of the local application; and
the plug-in module of the local application, configured to send account information of a user to a server of an opposite application, and when the server of the opposite application verifies the user successfully, obtain information of the user in the opposite application.

In the across-application network communication method and device, the plug-in is loaded and started in the local application, and the plug-in communicates with the background server of the opposite application, and obtains the buddy information of the user in the opposite application, so as to implement across-application network communication.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Reference throughout this specification to "one embodiment," "an embodiment," "specific embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in a specific embodiment," or the like in the singular or plural in various places throughout this specification are not necessarily all referring to the same embodiment. Furthermore, the particular features, structures, or characteristics may be combined in any suitable manner in one or more embodiments.

Figure 1:
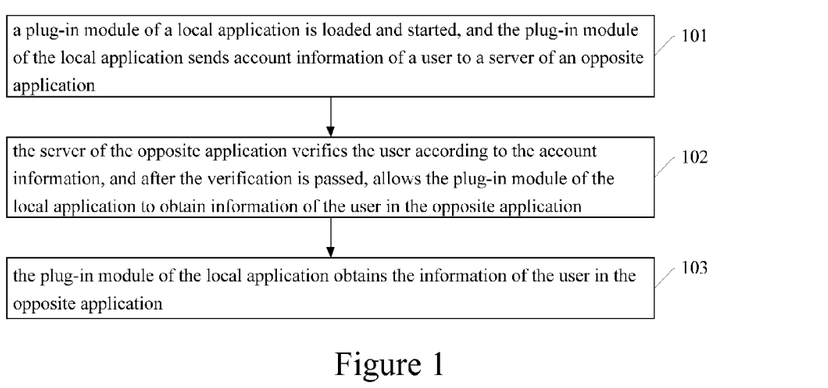
FIG. 1 is a flowchart of an across-application network communication method according to various embodiments.

Various embodiments provide an across-application network communication method. FIG. 1 is a flowchart of an across-application network communication method according to various embodiments. The method includes following blocks.

In block 101, a plug-in module of a local application is loaded and started, and the plug-in module of the local application sends account information of a user to a server of an opposite application.

In block 102, the server of the opposite application verifies the user according to the account information, and after the verification is passed, allows the plug-in module of the local application to obtain information of the user in the opposite application.

In block 103, the plug-in module of the local application obtains the information of the user in the opposite application.

In block 101, a method of loading and starting the plug-in module of the local application includes:

A) determining, by a program module of the local application, whether plug-in configuration information has been updated; if the plug-in configuration information has been updated, first downloading the plug-in configuration information from a server of the local application and storing the plug-in configuration information, and then performing process B); if the plug-in configuration information has not been updated, performing process B); and B) reading the plug-in configuration information stored locally, loading and starting the plug-in module of the local application according to the plug-in configuration information.

When the local application and the opposite application belong to the same account system, the account information of the user in the local application is the same as that in the opposite application. Accordingly, in block 101, a method of sending the account information of the user to the server of the opposite application by the plug-in module of the local application includes that the plug-in module of the local application obtains the account information of the user in the opposite application (which is the same as that in the local application and has been inputted by the user), sends the account information of the user in the opposite application to the server of the opposite application.

When the local application and the opposite application belong to different account systems, the account information of the user in the local application is different from that in the opposite application. Accordingly, in block 101, a method of sending the account information of the user to the server of the opposite application by the plug-in module of the local application includes that the plug-in module of the local application determines whether a relationship between the account information of the user in the local application and the account information of the user in the opposite application is stored locally; if yes, the plug-in module of the local application obtains the account information of the user in the opposite application according to the account information of the user in the local application and the relationship, and sends the account information of the user in the opposite application to the server of the opposite application; if no, the plug-in module of the local application prompts the user to input the account information of the user in the opposite application, receives the account information of the user in the opposite application, and sends the account information of the user in the opposite application to the server of the opposite application.

In order to avoid that the user inputs the account information of the user in the opposite application every time the user uses this service, the plug-in module of the local application may further establish and store the relationship between the account information of the user in the local application and the account information of the user in the opposite application after receiving the account information of the user in the opposite application, so as to directly obtain the account information of the user in the opposite application according to the stored relationship in subsequent application processes.

The plug-in module of the local application may send the obtained information to the program module of the local application, and the program module of the local application displays the information.

The user in the local application may view buddy information of the user in the opposite application, and exchange information and comments with the buddy in the opposite application. A method of exchanging with the buddy in the opposite application includes: the plug-in module of the local application receives information input by the user, and sends the information to the server of the opposite application; after the buddy in the opposite application returns information to the user, the plug-in module of the local application receives the information returned by the server of the opposite application and sends the returned information to the program module of the local application, and the program module of the local application displays the received information. The above process is repeated, so that the user in the local application can exchange with the buddy in the opposite application.

An adapter module of the opposite application may be configured in the local application, via which the plug-in module of the local application may exchange information with the server of the opposite application. A method may include:

the adapter module of the opposite application receives information from the plug-in module of the local application, converts the information into a format which can be recognized by the server of the opposite application, and sends the converted information to the server of the opposite application;

or, the adapter module of the opposite application receives information from the server of the opposite application, converts the information into a format which can be recognized by the plug-in module of the local application, and sends the converted information to the plug-in module of the local application.

Various embodiments will be illustrated in detail hereinafter.

A first embodiment is provided.

In this embodiment, an application $APP_1$ is taken as a local application, applications $APP_2$ to $APP_N$ are taken as opposite applications, and a user in $APP_1$ accesses $APP_N$. When $APP_1$ starts, $APP_1$ starts and runs the plug-in of $APP_1$. If $APP_1$ and $APP_N$ belong to the same account system, $APP_1$ directly verifies user information after starting the plug-in of $APP_1$. After the verification is passed, $APP_1$ may communicate with a background server of $APP_N$. If $APP_1$ and $APP_N$ belong to different account systems, the user inputs the account information of the third party application $APP_N$ first. After the account information is verified successfully, $APP_1$ automatically communicates with the background server of $APP_N$ for bundling an account application platform, obtains and displays buddy information of the user. In this way, the user in $APP_1$ may instantly communicate with the buddy in other APPs.

Figure 2:
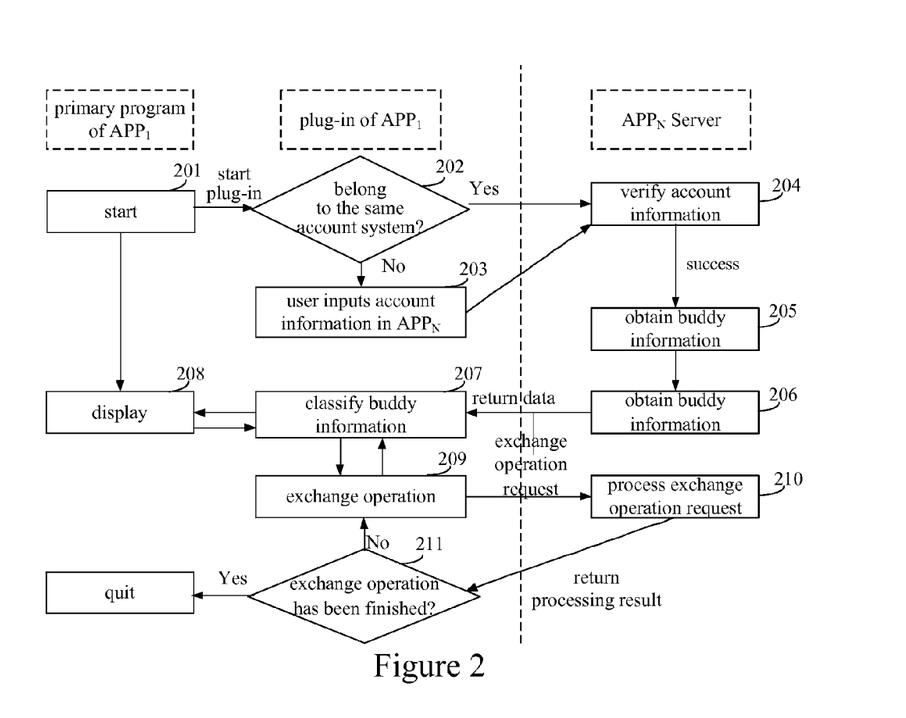
FIG. 2 is a flowchart of an across-application network communication method according to various embodiments.

FIG. 2 is a flowchart of the first embodiment, which includes following blocks.

In block 201, when a primary program of $APP_1$ starts, the primary program of $APP_1$ starts and runs the plug-in of $APP_1$.

In block 202, the plug-in of $APP_1$ determines whether $APP_1$ and $APP_N$ belong to the same account system; if yes, the plug-in of $APP_1$ sends the account information of the user in $APP_N$ (which is the same as that in $APP_1$, and has been input by the user in advance) to the server of $APP_N$ ($APP_N$ Server), and block 204 is performed; if no, block 203 is performed.

In block 203, the plug-in of $APP_1$ requests the user to input the account information in $APP_N$, receives the account information input by the user, detects an application $APP_N$ corresponding to the account information according to the account information, sends the account information of the user in $APP_N$ to the $APP_N$ Server, and block 204 is performed.

In blocks 204 to 206, the $APP_N$ Server verifies the user according to the account information, and after the verification is passed, the $APP_N$ Server allows the plug-in of $APP_1$ to obtain the buddy information of the user; the plug-in of $APP_1$ obtains the buddy information of the user such as buddy materials and online states, and extracts needed buddy information.

In blocks 207 and 208, the plug-in of $APP_1$ classifies and processes the obtained buddy information, and provides the buddy information to the primary program of $APP_1$ to display the buddy information.

Thus, the user in $APP_1$ may read the buddy information in $APP_N$. If the user intends to communicate with the buddy in $APP_N$, following blocks are performed.

In block 209, after receiving an exchange operation of the user, the plug-in of $APP_1$ sends an exchange operation request to the $APP_N$ Server.

In block 210, the $APP_N$ Server processes the exchange operation request, and returns a processing result to the plug-in of $APP_1$.

In block 211, the plug-in of $APP_1$ determines whether the exchange operation has been finished; if yes, the primary program of $APP_1$ quits, if no, the exchange operation continues.

The above exchange operation may be processed by the plug-in of $APP_1$ and displayed by the primary program of $APP_1$.

A second embodiment is provided.

In this embodiment, a method of loading and starting the plug-in module of the local application by the program module of the local application is illustrated. $APP_1$ is still taken as the local application. Every time $APP_1$ runs, the primary program of $APP_1$ requests the background server of $APP_1$ for plug-in configuration information. If the plug-in configuration information is updated, the primary program of $APP_1$ downloads and updates the configuration file stored locally. If the plug-in configuration information is not updated, the primary program of $APP_1$ directly reads a plug-in configuration list from the configuration file stored locally. Afterwards, the primary program of $APP_1$ starts plug-ins in turn according to the obtained plug-in configuration list. When starting each plug-in, the primary program of $APP_1$ loads the plug-in first, then initiates the plug-in according to the obtained configuration parameters, and displays the plug-in after initiation.

Figure 3:
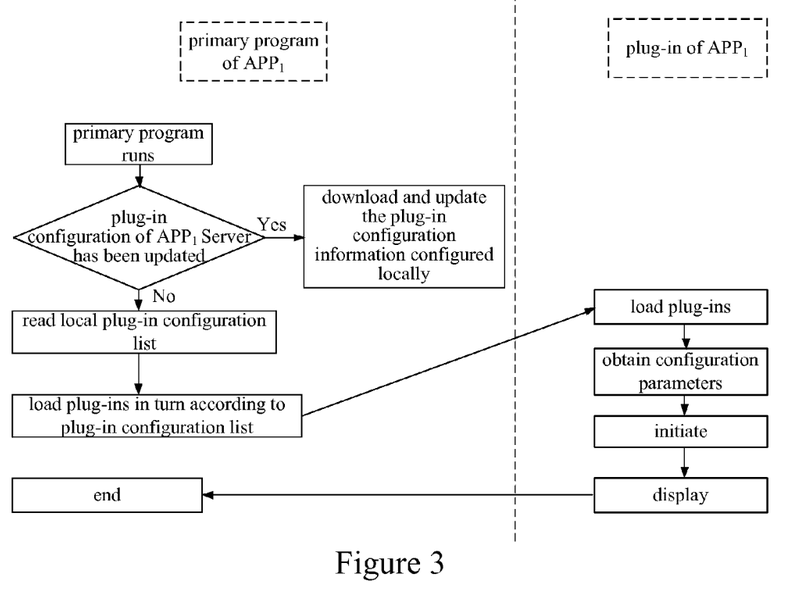
FIG. 3 is a flowchart of an across-application network communication method according to various embodiments.

FIG. 3 is a flowchart of the second embodiment, which includes following blocks.

In block 301, after the primary program of $APP_1$ runs, the primary program of $APP_1$ determines whether the plug-in configuration of $APP_1$ Server has been updated; if yes, block 302 is performed; otherwise, block 303 is performed.

In block 302, the primary program of $APP_1$ downloads and updates the plug-in configuration information configured locally, and block 303 is performed.

In block 303, the primary program of $APP_1$ reads a local plug-in configuration list.

In blocks 304 to 308, the primary program of $APP_1$ loads plug-ins in turn according to the plug-in configuration list, initiates the plug-ins according to the obtained configuration parameters, and displays the plug-ins after initiation.

A third embodiment is provided.

Among different applications in different account systems, after the plug-in of $APP_1$ is started, the user needs to provide the account information of the third party application $APP_N$ to verify the user. In order to avoid that the user inputs an account password every time the user uses this service, this embodiment provides an account bundling function. The account bundling function refers to establishing a mapping relationship between the account of $APP_1$ in one account system and the account of $APP_N$ in another account system. If $APP_1$ and $APP_N$ belong to different account systems, it is required to first query whether the user has bundled the account of $APP_N$.

If the user does not bundle the account of $APP_N$, the plug-in of $APP_1$ determines whether the user uses this service for the first time. If yes, the plug-in of $APP_1$ recommends the user to bundle the account of $APP_N$, and stores the account information of $APP_N$ in the $APP_1$ Server. If no, the plug-in of $APP_1$ determines whether the user selects a local storing password or directly inputs the account to perform logging verification.

If the user has bundled the account of $APP_N$, every time the user logs on the primary program of $APP_1$ successfully, the primary program of $APP_1$ automatically obtains the bundled account of $APP_N$ from the $APP_1$ Server, and makes the bundled account of $APP_N$ be verified by the background server of $APP_N$.

After the verification is passed, the plug-in of $APP_1$ obtains the account information in $APP_N$, obtains the buddy information and online state of the account, and displays the buddy information and online state of the account in the primary program of $APP_1$, so as to provide supports for instant communication of the user among multiple Internet applications.

Figure 4:
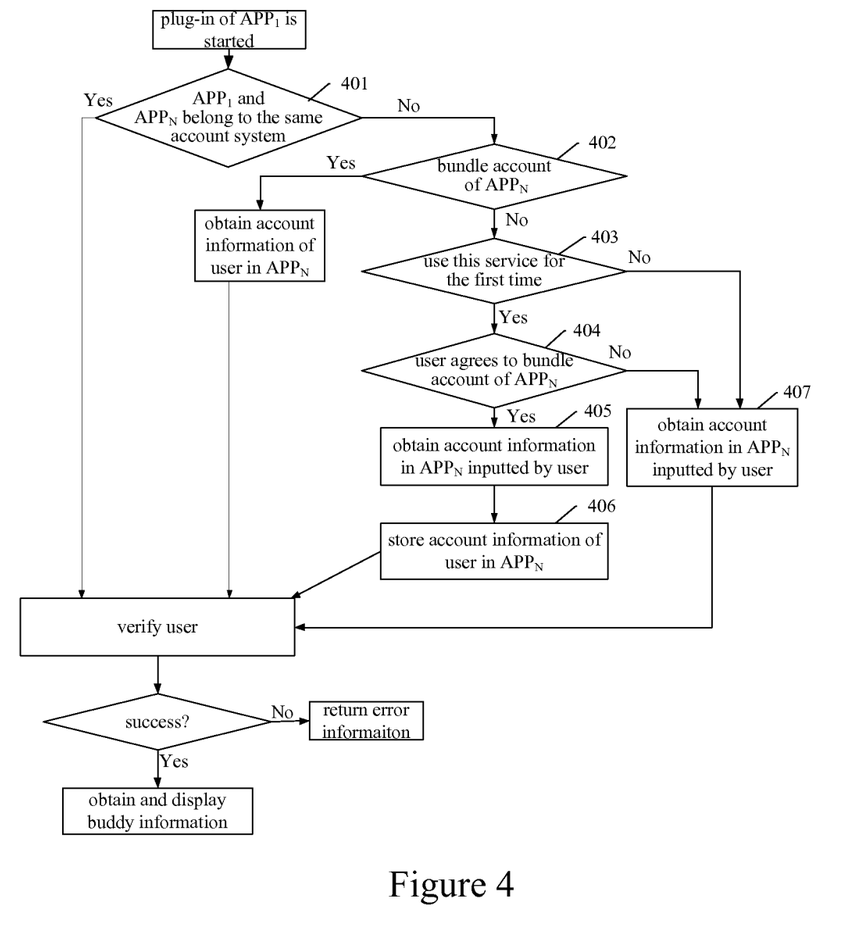
FIG. 4 is a flowchart of an across-application network communication method according to various embodiments.

FIG. 4 is a flowchart of a third embodiment which includes following blocks.

In block 401, after the plug-in of $APP_1$ is started, the plug-in of $APP_1$ determines whether $APP_1$ and $APP_N$ belong to the same account system; if yes, the account information of the user in $APP_N$ (which is the same as that in $APP_1$) is directly verified; otherwise, block 402 is performed.

In block 402, it is determined whether the account of $APP_N$ has been bundled; if yes, the account information of the user in $APP_N$ is obtained and verified; otherwise, block 403 is performed.

In block 403, it is determined whether the user uses this service for the first time; if yes, block 404 is performed; otherwise, the account information in $APP_N$ inputted by the user is obtained and verified.

In block 404, the plug-in of $APP_1$ recommends the user to bundle the account of $APP_N$, and determines whether the user agrees to bundle the account of $APP_N$; if yes, block 405 is performed; otherwise, block 407 is performed.

In blocks 405 and 406, the plug-in of $APP_1$ obtains and stores the account information in $APP_N$ input by the user, and causes the account information in $APP_N$ to be verified.

In block 407, the account information in $APP_N$ input by the user is obtained and verified A fourth embodiment is provided.

Figure 5:
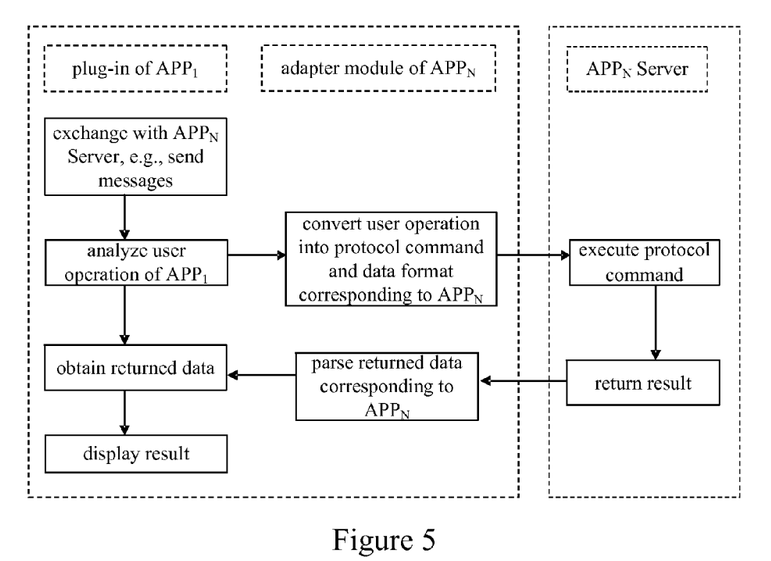
FIG. 5 is a flowchart of an across-application network communication method according to various embodiments.

FIG. 5 is a flowchart of the fourth embodiment. In this embodiment, the adapter module of $APP_N$ is applied in the primary program of $APP_1$ to exchange information between the plug-in of $APP_1$ and the $APP_N$ Server. When receiving a user operation from the plug-in of $APP_1$, the adapter module of $APP_N$ converts the user operation into a protocol command and data format corresponding to the account of $APP_N$, and then communicates with the $APP_N$ Server. The adapter module of $APP_N$ obtains a result and data after the $APP_N$ Server executes the protocol command, parses the protocol command and the turned data, and displays the result in the primary program of $APP_1$.

Figure 6:
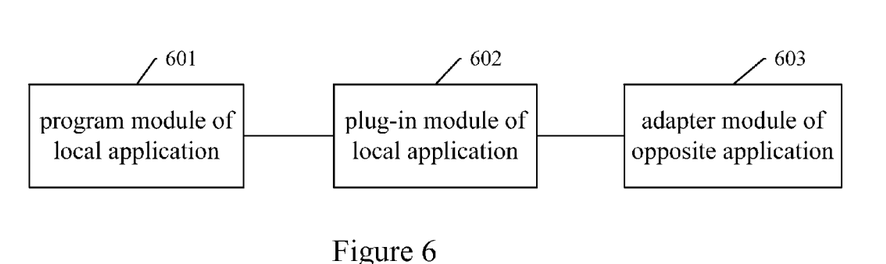
FIG. 6 is a schematic diagram illustrating the structure of an across-application network communication device according to various embodiments.

Various embodiments also provide an across-application network communication device. FIG. 6 is a schematic diagram illustrating an across-application network communication device according to various embodiments. The device includes a program module 601 of a local application and a plug-in module 602 of the local application.

The program module 601 of the local application is configured to load and start the plug-in module 602 of the local application.

The plug-in module 602 of the local application is configured to send account information of a user to a server of an opposite application, and when the server of the opposite application verifies the user successfully, obtain information of the user in the opposite application.

A method of loading and starting the plug-in module 602 of the local application by the program module 601 of the local application includes:

A) determining whether plug-in configuration information has been updated; if the plug-in configuration information has been updated, first downloading the plug-in configuration information from a server of the local application and storing the plug-in configuration information, and then performing process B); if the plug-in configuration information has not been updated, performing process B); and B) reading the plug-in configuration information stored locally, loading and starting the plug-in module of the local application according to the plug-in configuration information.

A method of sending the account information of the user to the server of the opposite application by the plug-in module 602 of the local application includes:

determining whether a relationship between the account information of the user in the local application and the account information of the user in the opposite application is stored locally; if yes, obtaining the account information of the user in the opposite application according to the account information of the user in the local application and the relationship, and sending the account information of the user in the opposite application to the server of the opposite application; if no, prompting the user to input the account information of the user in the opposite application, receiving the account information of the user in the opposite application that is input by the user, sending the account information of the user in the opposite application to the server of the opposite application, and establishing and storing a relationship between the account information of the user in the local application and the account information of the user in the opposite application.

The above device further includes an adapter module 603 of the opposite application, which is connected to the plug-in module 602 of the local application and the server of the opposite application respectively.

When receiving information from the plug-in module 602 of the local application, the adapter 603 module of the opposite application converts the information into a format which can be recognized by the server of the opposite application, and sends the converted information to the server of the opposite application. When receiving information from the server of the opposite application, the adapter module 603 of the opposite application converts the information into a format which can be recognized by the plug-in module 602 of the local application, and sends the converted information to the plug-in module 602 of the local application.

In the across-application network communication method and device, the plug-in is loaded and started in the local application, and the plug-in communicates with the background server of the opposite application, and obtains the buddy information of the user in the opposite application, so as to implement across-application network communication. The specific functions may be extended, maintained and configured, so as to extend the interconnection of user among different applications and provide support for constructing an information exchange platform containing the third party application.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An across-application network communication method, comprising:

loading and starting a plug-in module of a local application, and sending, by the plug-in module of the local application, account information of a user to a server of an opposite application;

verifying, by a server of the opposite application, the user according to the account information of the user, and when the verification is passed, allowing the plug-in module of the local application to obtain information of the user in the opposite application; and obtaining, by the plug-in module of the local application, the information of the user in the opposite application;

wherein when the local application and the opposite application belong to different account systems, the sending, by the plug-in module of the local application, the account information of the user to the server of the opposite application comprises:

determining, by the plug-in module of the local application, whether a relationship between the account information of the user in the local application and account information of the user in the opposite application is stored locally; if the relationship is stored locally, obtaining the account information of the user in the opposite application according to the account information of the user in the local application and the relationship, and sending the account information of the user in the opposite application to the server of the opposite application; if the relationship is not stored locally, prompting the user to input the account information of the user in the opposite application, receiving the account information of the user in the opposite application that is inputted by the user, and sending the account information of the user in the opposite application to the server of the opposite application.

2. The method of claim 1, wherein the loading and starting the plug-in module of the local application comprises:
   A) determining, by a program module of the local application, whether plug-in configuration information has been updated; if the plug-in configuration information has been updated, downloading the plug-in configuration information from a server of the local application, storing the plug-in configuration information, and performing process B); if the plug-in configuration information has not been updated, performing process B); and
   B) reading the plug-in configuration information stored locally, loading and starting the plug-in module of the local application according to the plug-in configuration information.

3. The method of claim 2, after the plug-in module of the local application obtains the information of the user in the opposite application, further comprising:
   sending, by the plug-in module of the local application, the obtained information to a program module of the local application, and displaying, by the program module of the local application, the information; and
   receiving, by the plug-in module of the local application, exchange information inputted by the user, sending the exchange information to the server of the opposite application, receiving information returned by the server of the opposite application, and sending the returned information to the program module of the local application.

4. The method of claim 3, further comprising:
   exchanging information between the plug-in module of the local application and the server of the opposite application, the exchanging information further comprises one of:
   receiving, by an adapter module of the opposite application, information from the plug-in module of the local application, converting the information into a format which can be recognized by the server of the opposite application, and sending the converted information to the server of the opposite application; or
   receiving, by the adapter module of the opposite application, information from the server of the opposite application, converting the information into a format which can be recognized by the plug-in module of the local application, and sending the converted information to the plug-in module of the local application.

5. The method of claim 1, after the plug-in module of the local application receives the account information inputted by the user, further comprising: establishing and storing, by the plug-in module of the local application, a relationship between the account information of the user in the local application and the account information of the user in the opposite application.

6. The method of claim 1, after the plug-in module of the local application receives the account information inputted by the user, further comprising: establishing and storing, by the plug-in module of the local application, a relationship between the account information of the user in the local application and the account information of the user in the opposite application.

7. An across-application network communication device, comprising:
   a processor and a non-transitory storage, wherein the non-transitory storage is configured to store one or more instructions to be executed by the processor, and the one or more instructions comprise:
   a program instruction of a local application, configured to load and start a plug-in instruction of the local application; and
   the plug-in instruction of the local application, configured to send account information of a user to a server of an opposite application, and when the server of the opposite application verifies the user successfully, obtain information of the user in the opposite application;
   wherein the program instruction of the local application is configured to determine whether a relationship between the account information of the user in the local application and account information of the user in the opposite application is stored locally, if the relationship is stored locally, obtain the account information of the user in the opposite application according to the account information of the user in the local application and the relationship, and send the account information of the user in the opposite application to the server of the opposite application; if the relationship is not stored locally, prompt the user to input the account information of the user in the opposite application, receive the account information of the user in the opposite application that is inputted by the user, and send the account information of the user in the opposite application to the server of the opposite application.

8. The device of claim 7, wherein the program instruction of the local application is configured to
   A) determine whether plug-in configuration information has been updated; if the plug-in configuration information has been updated, download the plug-in configuration information from a server of the local application, store the plug-in configuration information, and perform process B); if the plug-in configuration information has not been updated, perform process B); and
   B) read the plug-in configuration information stored locally, load and start the plug-in instruction of the local application according to the plug-in configuration information.

9. The device of claim 8, further comprising an adapter instruction of the opposite application, which is connected to the plug-in instruction of the local application and the server of the opposite application respectively;
   the adapter instruction of the opposite application is configured to, when receiving information from the plug-in instruction of the local application, convert the information into a format which can be recognized by the server of the opposite application, and send the converted information to the server of the opposite application; when receiving information from the server of the opposite application, the adapter instruction of the opposite application is configured to convert the information into a format which can be recognized by the plug-in instruction of the local application, and send the converted information to the plug-in instruction of the local application.

10. The device of claim 7, further comprising an adapter instruction of the opposite application, which is connected to the plug-in instruction of the local application and the server of the opposite application respectively;

the adapter instruction of the opposite application is configured to, when receiving information from the plug-in instruction of the local application, convert the information into a format which can be recognized by the server of the opposite application, and send the converted information to the server of the opposite application; when receiving information from the server of the opposite application, the adapter instruction of the opposite application is configured to convert the information into a format which can be recognized by the plug-in instruction of the local application, and send the converted information to the plug-in instruction of the local application.

* * * * *